United States Patent [19]
Cornaby et al.

[11] Patent Number: 6,029,209
[45] Date of Patent: Feb. 22, 2000

[54] METHOD AND ARRANGEMENT FOR ALLOWING A COMPUTER TO COMMUNICATE WITH A DATA STORAGE DEVICE

[75] Inventors: Stephen R. Cornaby, Niwot; Tracy D. Harmer, Longmont, both of Colo.

[73] Assignee: Intersect Technologies, Inc., Longmont, Colo.

[21] Appl. No.: 09/209,877

[22] Filed: Dec. 11, 1998

Related U.S. Application Data

[63] Continuation of application No. 08/760,577, Dec. 4, 1996, Pat. No. 5,875,349.
[51] Int. Cl.[7] .................................................. G06F 12/00
[52] U.S. Cl. ............................................. 710/5; 710/33
[58] Field of Search ............................. 710/5, 8, 10, 22, 710/33, 102; 711/100; 713/100

[56] References Cited

U.S. PATENT DOCUMENTS

| | | |
|---|---|---|
| 5,136,713 | 8/1992 | Bealkowski et al. . |
| 5,237,689 | 8/1993 | Behnke . |
| 5,249,279 | 9/1993 | Schmank et al. ............................ 710/5 |
| 5,600,801 | 2/1997 | Parks et al. ............................. 710/102 |
| 5,713,006 | 1/1998 | Shigeeda ................................. 713/100 |
| 5,875,349 | 2/1999 | Cornaby et al. ............................ 710/5 |

*Primary Examiner*—Glenn A. Auve
*Attorney, Agent, or Firm*—W. Daniel Swayze, Jr.; Wade James Brady, III; Richard L. Donaldson

[57] ABSTRACT

A computer controlled system includes a data storage device connected to a host computer using a bus which allows device-initiated bus-mastering. The system has system RAM which is associated with the host computer and which is not part of the data storage device. The data storage device requires certain device operating data/code in the form of device control means and device operating data to be used to control the operation of the device. An arrangement and method for operating the data storage device includes storing at least a portion of the device operating data/code in the system RAM. The arrangement and method further include allowing the host computer and/or the data storage device access to the device operating data/code stored in the system RAM such that the host computer and/or the data storage device may use the device operating data/code to control the operation of the data storage device.

10 Claims, 6 Drawing Sheets

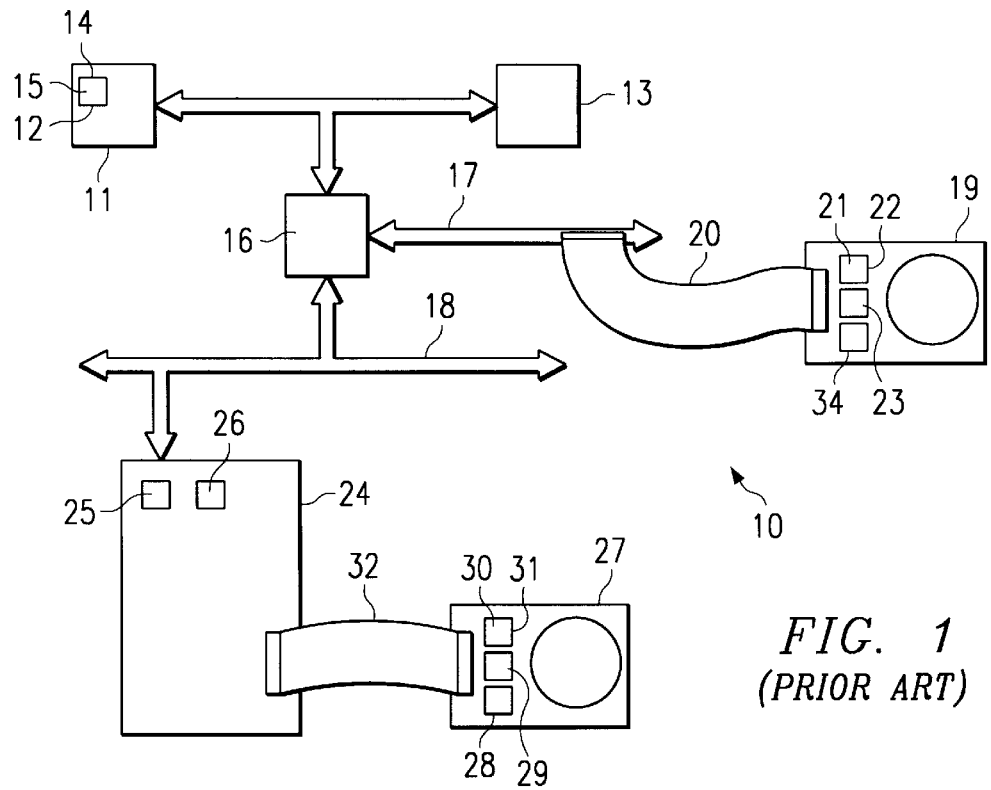
FIG. 1
(PRIOR ART)
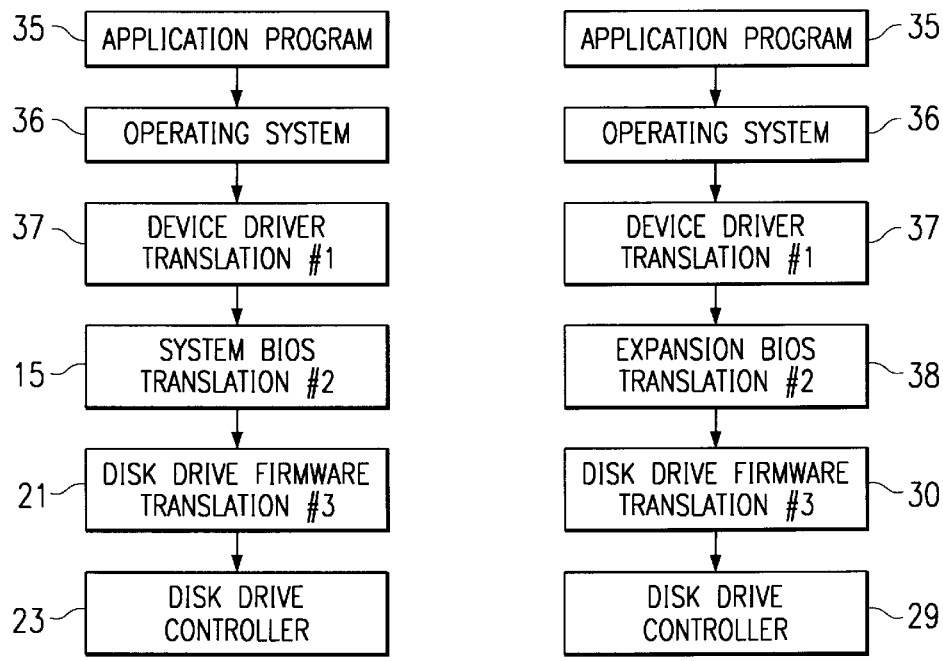
FIG. 2A
(PRIOR ART)
FIG. 2B
(PRIOR ART)

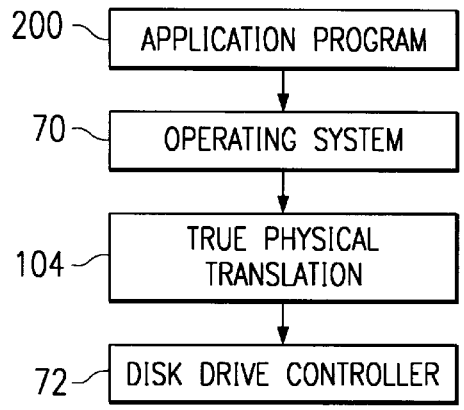
FIG. 9A
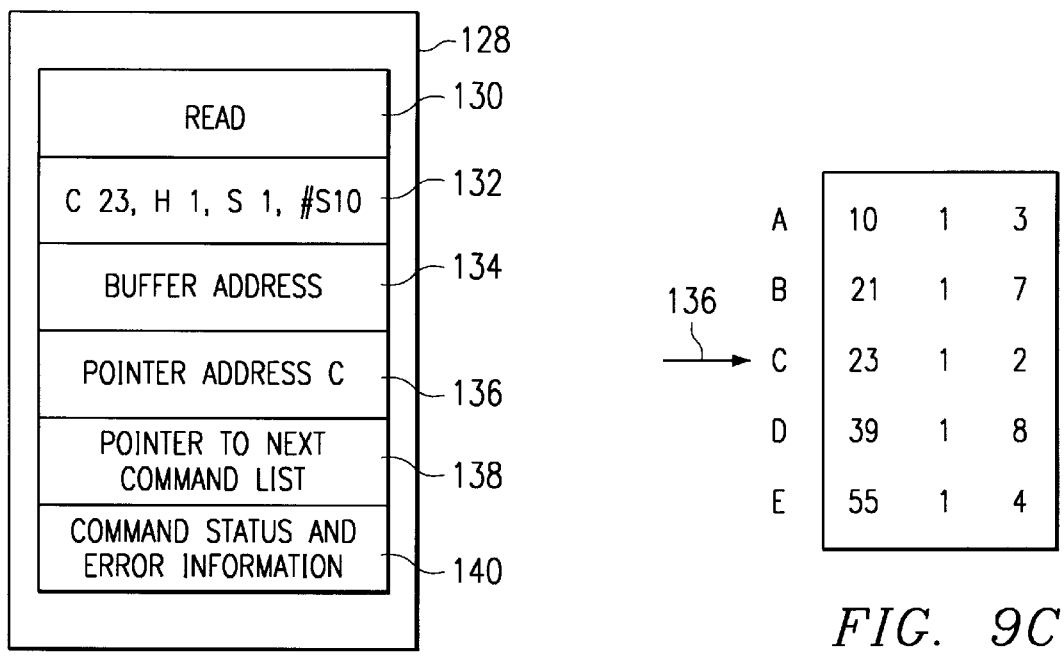
FIG. 9B
FIG. 9C

METHOD AND ARRANGEMENT FOR ALLOWING A COMPUTER TO COMMUNICATE WITH A DATA STORAGE DEVICE

This application is a continuation of application Ser. No. 08/760,577, filed Dec. 4, 1996, now U.S. Pat. No. 5,875,349.

BACKGROUND OF THE INVENTION

The present invention relates generally to an arrangement for and method of allowing a computer controlled system having a host computer and system Random Access Memory (RAM) to communicate with a data storage device connected to the computer controlled system using a bus which allows bus-initiated bus-mastering. More particularly the present invention relates to storing operating data and code for controlling the operation of the data storage device in the system RAM for use by the host computer and/or the data storage device.

As used herein, it is to be understood that the terms computer controlled system or computer system refers to any system which includes a host computer arrangement or a microprocessor for controlling the operation of the system. It is also to be understood that the term System RAM refers to any memory used by the host computer or microprocessor for its operation. The computer controlled system may include consumer electronics, appliances, or any other computer controlled device as well as general purpose computers such as personal computers and computer servers. It should also be understood that the terms data storage device or storage device are intended to include hard disk drives, CD drives, floppy disk drives, removable hard disk drives, and other storage devices including other optical, magnetic, opto-magnetic, and any other mass storage peripheral devices. These other storage devices also include devices such as digital video disk devices and flash memory which are currently being developed for use as storage devices for various types of computer systems. Also, as used herein, the phrases operating data and code or operating data/code are intended to refer to all of the various data and code that is required in order to operate the storage device.

Storage devices of all types share certain characteristics including an arrangement to uniquely address each addressable unit of the data on the media in which data is stored, an arrangement to control the device, and an arrangement to transport the data from the device to the system to which the device is connected. Hard disk drives are among the oldest and most popular of storage devices and have the longest history within computer systems. While much of the following discussion specifically relates to hard disk drives, it is to be understood that the principles of data addressing, device control, and data transport are not unique to hard disk drives and relate generally to all types of storage devices.

During the development of the personal computer industry, the typical arrangements for operating a hard disk drive connected to a host computer have gone through a series of evolutions. When the personal computer was first being developed, it was assumed that hard disk drives would be divided into cylinders, heads, and sectors which would clearly define each data sector in which information could be stored on the hard disk drive. The DOS operating system defined a multiple byte, bit significant command structure with organizational limits of 1024 cylinders, 64 heads, and 64 sectors which corresponded to a total of 4,194,304 data sectors. The system BIOS, or a utility program used by this early computer system, was used to store any defective data sectors of the hard drive. These defective data sectors were required to be known by the system when the drive was formatted for use by the system. The system would not allow these defective data sectors to be used during the operation of the system. Therefore, only known good data sectors were used to store data and the actual cylinder, head, and sector (CHS) on which the data was stored on the hard disk drive corresponded to the CHS data addressing information used by the operating system running the host computer.

In the early stages of development, the system BIOS also contained information on all of the disk drives which could be used with the system. As the number of drives available grew this approach became more and more difficult. The solution was to create user defined configuration information which could be used by the system.

These early approaches allowed the operating system to communicate with the disk drive using a relatively simple system BIOS which did not need to perform any translation of the CHS data address information. When the operating system of these early systems made a read/write request through the system BIOS, the system BIOS would simply pass the CHS address information on to the disk drive without having to translate the address information into some other format. Also, the disk drive was relatively simple in that it did not require any complex disk drive firmware as part of the disk drive to provide a translation function or handle the problem of keeping track of the defective data sectors since these functions were provided by the system.

The disk drive industry independently developed its own interface standards or limits known as Integrated Device Electronics (IDE) which also included a command structure. These IDE standards imposed limits which were different from the limits imposed by the operating system and system BIOS. The IDE command structure limits were set at 65,535 cylinders, 16 heads, and 256 sectors which provided a total of 268,431,360 data sectors. Since both standards utilized the same CHS addressing structure, the overall system limits were dictated by the lowest common bits for each field for the cylinders, heads, and sectors. This resulted in a combined limit of 1024 cylinders, 16 heads, and 64 sectors for a total of 1,048,576 data sectors. Although the combination of these two different limits did not initially create a problem by overly limiting the total data storage capacity of the disk drive, the demand for larger and larger capacity disk drives did eventually create a desire to offer drives which provided more sectors than were available according to the combination of these two limits.

To compensate for these combined limits, translation software was developed to translate from the operating system limits to the IDE drive limits. This software was provided in the form of either translating system BIOS or boot overlay translating BIOS software. The translation software allowed the operating system to use the entire theoretical number of data sectors which the operating system limits allowed by translating from an operating system based CHS address to a disk drive based CHS address. However, each time a read/write request was made by the operating system, the translator had to translate the operating system's theoretical CHS address information (based on the DOS operating system standards) into logical CHS address information used by the disk drive (based on the disk drive industry standards). This translation required additional processing time slowing down the system but it increased the number of available data sectors back to the limits imposed by the operating system.

Technical developments in the disk drive industry further complicated the task of interfacing the hard disk drive with the host computer by making the hard disk drives more complex. The first additional development was that the hard disk drive industry began defining each data sector according to cylinders, heads, sectors, and zones. The zones of the disk drive correspond to different groups of cylinders of the disks with each of the zones having data stored at different frequencies in order to more efficiently use the data storing density of the disks. For example, the outer cylinders, which correspond to a first zone, may be read and written at a first frequency. The middle cylinders making up a second zone may be read/written at a second slower frequency. And finally, the inner cylinders, associated with a third zone, may be read and written at a third even slower frequency.

Although the use of zones increased the storage capacity of a given hard disk drive, it also further increased the complexity of the disk drive firmware and disk drive operating data required to control the disk drive. These new, complex disk drives required more complex disk drive firmware to perform another translation from the logical IDE CHS address information to the actual cylinder, head, sector, and zone address information actually used by the disk drive. Also, these complex disk drives required the disk drive read channel to be able to be operated at different frequencies depending on the zone being accessed. This required the complex disk drive to include disk drive operating data identifying which sectors were in which zones, read channel data identifying which control settings (such as frequencies) should be used when accessing data within each of the various zones, and disk drive firmware for controlling these more complex zone oriented operations of the complex disk drive. For purposes of discussion, disk drives including the above described zones will be referred to throughout the specification and claims as a complex disk drive.

In another development, the disk drive industry changed the way the cylinders, heads, and sectors were typically addressed. Initially, each data sector on the disk drive included an identification field containing the address of that field and including information on whether that sector was defective or not. These identification fields for each of the data sectors used a significant portion (i.e. 7–10%) of the data storage space on the disk drive thereby reducing the amount of usable data storage space for a given disk drive. As more advanced disk drives having more sophisticated controllers and firmware became available, the need for an identification field associated with each data sector was eliminated thereby increasing the data storage capacity of a given disk drive. However, using this approach required the defect information identifying which sectors of the disk drive are defective to be stored in a different way.

In order to solve this problem, disk drive operating data in the form of a defect list containing a list of all the defective data sectors on the complex disk drive is typically stored on the storage media of the complex hard disk drive. The defect list is loaded into a RAM memory buffer on the disk drive device during the initialization of the disk drive so that the list is available to the hard drive controller and/or firmware during the operation of the disk drive. This approach requires an even more complex controller, more complex disk drive firmware to operate the controller, and a larger RAM memory buffer than would otherwise be required so that the data associated with the defect list may be stored in the memory buffer for use throughout the operation of the complex disk drive. All of these requirements add still further to the cost of providing the complex hard disk drive.

Using this defect list approach, the complex hard disk drive controller uses complex hardware and/or disk drive firmware to sort through this list of defective memory storage locations each time a read/write request is made making sure a defective data sector is not utilized. This sorting adds yet another time consuming process to the operation of the system that must be performed each time the complex disk drive reads or writes data and therefore slows down the overall operation of the system.

Since storage devices are typically electromechanical in nature, the time required to access data is much longer than the time required to access system RAM, effectively decreasing system performance. In order to decrease some of the effects of mechanical latencies, it is possible to utilize time that the storage device would normally be idle to gather data from the storage media which has a high likelihood of being accessed by the system and storing that data in a fast access storage element such as RAM on the storage device. Such a mechanism is commonly known throughout the industry as read caching. There are several read caching mechanisms, some of which are anticipatory in nature while others are based upon data retention. In addition, there are mechanisms to retain write data in a write cache until it is convenient to physically record it to the storage device. Hopefully this data is recorded at a time that will decrease the impact on the system performance.

Storage devices typically employ electronic data storage elements such as RAM on the device to store read cache data or store write cache data. While caching is not required for the operation of a storage device, it has become a standard feature on many storage devices. The additional RAM used for read/write caching further increases the cost of the storage device.

In more recent developments in computer architecture, new serial and parallel bus architectures have been defined which implement device-initiated bus-mastering. Device-initiated bus-mastering is a mechanism which allows the device to control the address which is being written to or read from system memory. Additionally, device-initiated bus-mastering allows a device to bus master at will without any other controlling hardware or software on the host. The PCI (Peripheral Computer Interconnect) bus implements this mechanism on a parallel bus configuration. The IEEE 1394 specification implements this mechanism on a serial bus configuration.

Some of the new peripheral bus architectures also allow relocatable device specific host software to be loaded from the device into system RAM in the form of relocatable Expansion BIOS. This greatly reduces the device's dependency on the host system BIOS. One current example of this is the PCI bus architecture. Other bus architectures, such as the IEEE 1394 bus, may add these capabilities in the future.

Referring to FIG. 1, a typical current computer system, generally indicated by reference numeral 10, including a complex IDE hard disk drive and a complex hard disk drive connected to the system using a SCSI (Small Computer System Interface) adapter card and a PCI bus will be described. As shown in FIG. 1, system 10 includes a host computer module 11 (hereinafter referred to in the specification and the claims as a host computer) having system BIOS ROM 12 or otherwise loaded system ROM code and system RAM 13. The system is operated using a system BIOS code 14 and either a system translating BIOS 15 or boot overlay translating BIOS software which was either stored within system BIOS ROM 12 or loaded in system RAM 13 (shadow or loaded). A host bridge 16 connects host computer 11 to an ISA bus 17 and a PCI bus 18. A first complex hard disk drive 19 is connected to ISA bus 17 using ribbon cable 20. Drive 19 includes disk drive firmware 21 stored in ROM 22 and disk drive controller 23 for controlling the operation of disk drive 19.

A peripheral device, in the form of a SCSI adapter card 24 is connected to PCI bus 18 and includes a protocol translator 25 for translating all of the communications passing through adapter card 24 between the PCI protocol of the PCI bus and the protocol of the adapter card, in this case SCSI protocol. Adapter card 24 also includes Expansion BIOS ROM 26 which contains Expansion BIOS for initializing and operating adapter card 24 during the start-up of the system. System 10 further includes a second complex hard disk drive 27 which is connected to adapter card 24. Disk drive 27 includes a RAM memory buffer 28, a disk drive controller 29, and disk drive firmware 30 stored within ROM 31 for controlling the operation of the hard disk drive 27. Hard disk drive 27 is electrically connected to adapter card 24 using ribbon cable 32. Both complex hard disk drives 19 and 27 are divided into cylinder, heads, sectors, and zones which specifically define each data sector within hard disk drives 19 and 27.

In a typical PCI based system as described above, when the system is turned on, system BIOS 14 checks the system first for peripheral devices connected to ISA bus 17 such as complex disk drive 19. In this case, when disk drive 19 is located, the system BIOS initializes disk drive 19 and configures it for use within the system. Hard disk drive 19 includes a RAM memory buffer 34 and the initialization process for hard disk drive 19 includes loading information such as a defect list of all of the defective memory storage locations on the hard disk drive from the storage media of hard disk drive 19 into a RAM memory buffer 34. This information is available for use by disk drive firmware 21 throughout the operation of disk drive 19.

After the ISA devices have been configured, the system then checks for peripheral devices connected to PCI bus 18 such as adapter card 24. When adapter card 24 is located, the system BIOS checks to see if there is any Expansion BIOS associated with the adapter card. If there is Expansion BIOS associated with the adapter card, in this case the Expansion BIOS in Expansion BIOS ROM 26, the Expansion BIOS is loaded into RAM 13 by the system ROM code. Adapter card 24, along with any attached peripherals such as complex disk drive 27, are then initialized. The initialization process for hard disk drive 27 includes loading information such as a defect list of all of the defective memory storage locations on the hard disk drive from the storage media of hard disk drive 27 into RAM memory buffer 28 so that this information is available for use by disk drive firmware 30 throughout the operation of disk drive 27. After system 10 is finished checking for devices connected to the PCI bus of the system, the system BIOS goes on to load an operating system which is used to control the operation of the overall system.

Referring to FIG. 1 along with the block diagrams of FIGS. 2A and 2B respectively, the operation of system 10 when an application program 35 being run on the system makes a read/write request of either complex hard disk drive 19 or 27 will be briefly described. With respect to hard drive 19 and as shown in FIG. 2A, when application 35 makes a read/write request of hard drive 19, an operating system 36 for operating the system 10 receives the request and determines the theoretical, or logical, address information at which operating system 36 believes the data is stored within disk drive 19. A device driver 37, which is specific to operating system 36, translates the operating system logical address information into system logical address information (translation #1). System translating BIOS 15 then translates this system logical address information into logical address information used by IDE disk drive 19 (translation #2). Firmware 21, using controller 23, translates the logical IDE address information into physical cylinder, head, sector, and zone address information used by the disk drive (translation #3) and checks a defective memory storage location list to make sure defective data locations are not utilized. Once these three translations are complete, controller 23 reads or writes the requested information from or to the media.

Referring now to FIG. 2B, when application 35 makes a read/write request of complex disk drive 27, operating system 36 receives the request and determines the logical address information at which operating system 36 believes the data is stored within disk drive 27. Operating system 36 then generates a read/write request to have disk drive 27 read/write the data at the determined logical address. Device driver 37 translates the operating system logical address information into system logical address information (translation #1). The Expansion BIOS associated with SCSI card adapter 24, which was loaded into system RAM during the start-up of the system, translates the system logical address information into SCSI logical address information as indicated in block 38 (translation #2). Firmware 30, using controller 29, translates the SCSI logical address information into physical cylinder, head, sector, and zone address information used by the disk drive (translation #3) and checks the defective memory storage location list stored in memory buffer 28 to make sure defective data locations are not utilized. And finally, after each of these translations are complete, controller 29 reads or writes the requested information.

As can be seen by the above description, several translations are required in both directions for each information request for both disk drive 19 and disk drive 27. These translations use processing time, slowing the speed of the overall system. Also, this general approach requires a complex translating BIOS or Expansion BIOS and complex disk drive firmware on the disk drive in order to operate the currently available complex disk drives typically used in current systems. These requirements add significantly to the cost of the hard disk drive by requiring (i) a greater amount of ROM on the drive for storing the more complex disk drive firmware, (ii) a more powerful processor or controller on the drive to perform the tasks of translating the address information, (iii) a greater amount of buffer RAM on the drive for storing and manipulating the operating data of the complex disk drive, and (iv) increased product development and verification time and expense due to the increased complexity of the drive.

Referring to FIG. 3, the operation of typical computer system 10 including a hard disk drive will be further described. At this point, the operation will be described in terms of drive 27, however, the operation of drive 19 would be carried out in a similar manner. In order to operate complex disk drive 27, host computer 11 includes host code 40 which is part of system BIOS code 14 and which is stored in system RAM 13. Host code 40 is used to provide command control of disk drive 27. Disk drive 27 includes certain operating data and code 42 which are required for the operation of disk drive 27. Operating data/code 42 include disk drive firmware 30A and 30B which are stored in ROM 31 and disk drive operating data 44, which is stored in RAM memory buffer 28 for use by firmware 30A and 30B during the operation of the disk drive. Disk drive operating data 44 includes a variety of disk drive operating data such as zone location data, control settings data for controller 29, and defective memory storage location data which is required for the operation of the disk drive.

As illustrated by arrow 46 in FIG. 3, host code 40 in system RAM 13 only has command control over disk drive 27, that is, host code 40 does not have access to disk drive operating data 44 Also, host code 40 does not include the hard disk drive specific firmware necessary to utilize disk drive operating data 44 or control the specific operations of disk drive 27. Because of this, host code 40, and therefore host computer 11, is not able to i) translate the address information into the address information required by the lowest level of the disk drive firmware in disk drive 27 and ii) identify and therefore not utilize the defective memory storage locations on disk drive 27 Therefore, as described in general above, all of these tasks must be performed by disk drive firmware 30A and 30B in disk drive 27 increasing the complexity and costs of the disk drive. After these tasks have been performed by disk drive 27 and the command requested by host code 40 has been executed, disk drive 27 returns the appropriate information back to the host computer as indicated by arrow 48.

When complex disk drive 27 receives a command from host code 40 of the host computer, disk drive firmware 30A translates the address information into address information used by the disk drive as described in detail above. Firmware 30A uses the defect information of disk drive operating data 44 stored in RAM memory buffer 28 to insure that defective memory storage locations are not utilized. By requiring complex disk drive 27 to carry out these functions and as generally described above, complex disk drive 27 requires a more complex controller, more complex firmware, and, in order to store disk drive operating data 44, a larger RAM memory buffer than would otherwise be necessary. These requirements add further to the cost of the hard disk drive by requiring (i) even more ROM within the disk drive for storing the additional disk drive firmware, (ii) a relatively large amount of RAM memory buffer space for storing disk drive operating data 44 for use during the operation of the disk drive, (iii) a more powerful processor or controller to perform the tasks of sorting through the defect lists and other disk drive operating data, and (iv) more product development time and expense.

As generally illustrated in FIG. 4, the present invention provides an arrangement for operating a complex hard disk drive device which is connected to a host computer having system RAM. This arrangement allows at least a portion of the disk drive operating data and code in the form of disk drive firmware and/or disk drive operating data required for the operation of the complex disk drive and normally stored in the complex disk drive itself to be stored in system RAM. An example of this is illustrated by the differences in FIG. 3 and FIG. 4. In accordance with the invention, in FIG. 4, disk drive firmware 30A and disk drive operating data 44 have been stored into system RAM 13. This arrangement also allows the host computer access to the disk drive operating data and code stored in system RAM such that the host computer may use the operating data and code to control the operation of the disk drive. The hard disk drive also has access to the operating data stored in system RAM such that the disk drive may use the operating data to control the operation of the disk drive. As will be described in detail hereinafter, this arrangement allows i) the amount of ROM required on board the disk drive for storing the disk drive firmware to be significantly reduced, ii) the complexity of the disk drive controller to be significantly reduced, iii) the amount of RAM memory buffer space required to store the disk drive operating data used during the operation of the disk drive to be significantly reduced or even eliminated, and (iv) the product development time and expense to be decreased. These reductions in the requirements of the components of the hard disk drive combine to allow substantial cost savings along with improved performance when providing a hard disk drive in accordance with the invention.

Using the arrangement of the present invention, cache functions can also be provided using system RAM. If this is the case, host executable firmware 30A in FIG. 4, allocates a portion of the system RAM for cache use. Therefore, the firmware 30A is able to issue unsolicited read commands to the storage device which then fills the system cache RAM with data which the operating system or application may request in the future. When such data is requested, it is already resident in system RAM, and can be quickly moved to the locations specified by the operating system or application program. Write cache is supported by allowing write data to remain within the system cache RAM after the firmware 30A reports to the operating system that the data has been written to the storage device. At some later convenient point in time, the firmware 30A issues write commands to the storage device in order to transport the data to the storage device media.

Using system RAM for cache in accordance with the invention and as briefly described above is much more efficient and cost effective than using storage device RAM. System RAM costs less per megabyte than device RAM, as it is usually purchased in larger blocks. Additionally, the amount of system RAM used for cache can be configured according to the needs of the user and the amount of system RAM available. A small amount of the cache can be allocated for systems where there is limited RAM available, and a larger cache for systems with more RAM. On system accesses where data is already in the system RAM, it is much faster to transfer the data from one location in system RAM to another rather than from the device. Therefore, this use of system RAM for cache provides improved cache performance.

FIG. 4 contrasts the operational control of a complex hard disk drive in accordance with the invention with the conventional system of FIG. 3 using the same reference numerals to represent items in FIG. 4 as were used to describe FIG. 3. As shown in FIG. 4, the present invention maintains host code 40 in system RAM 13 as was described for FIG. 3. However, in accordance with the invention, some or all of disk drive operating data 44 is stored in system RAM 13 rather than in the RAM memory buffer 28 of the hard disk drive. Also, a portion of the disk drive firmware, specifically the functionality of firmware 30A, is stored in system RAM 13 and operated (executed) on the host computer rather than being stored in ROM 31 on board the storage device and operated (executed) by the disk drive as was described above in FIG. 3. Only a portion of the disk drive firmware, that is firmware 30B, is required to be stored on board the disk drive for use during the operation of the disk drive. Furthermore, in accordance with the present invention and as indicated by arrows 50 and 52, the arrangement of the present invention allows both firmware 30B on the disk drive and the firmware stored in system RAM, that is firmware 30A, access to disk drive operating data 44 stored in system RAM.

As will be described in detail hereinafter, this arrangement allows many of the functions typically required to be carried out by the conventional complex hard disk drive firmware and controller to be performed by the host computer. For Example, the function of address translation to address information actually used by the disk drive and defective memory list management may be performed by the host computer. This arrangement also allows the host computer to perform other functions more intelligently such as read ahead and write caching functions as well as perform functions which were not previously possible using the conventional approach of keeping the disk drive firmware and data exclusively within the disk drive.

To this point, the operation of a conventional storage device has been described in detail with reference to a hard disk drive. However, the general principles of data addressing, device control, and data transport would be similar for other storage devices. For example, in the case of a CD drive, the CD drive typically includes operating data and code for controlling the operation of the CD drive. Since CD drives have not gone through the same extent of evolutions as described above for the hard disk drives, they may not have the problems associated with the multiple translations of addressing information. Other storage devices such as floppy drives, removable hard disk drives, and various other storage devices also utilize operating data and code to control the operation of the device. Although the operating data and code of these various devices would be specific to each particular type of device, the general principles would be similar to those described above for a hard disk drive.

The present invention allows operating data and code typically stored in the device itself and typically only used by the device itself to control the operation of the device to be stored in system RAM. In accordance with the invention, storing the operating data and code in the system RAM allows the host computer to use the operating data and code to control the operation of the storage device. By using the host computer to control some of the operations of the storage device, the cost and complexity of the storage device may be significantly reduced. Also, since the processors within the host computer are usually more powerful and since the system RAM may be accessed more quickly by the host system, the performance of the overall system may be improved.

SUMMARY OF THE INVENTION

As will be described in more detail hereinafter, an arrangement and method are disclosed herein for allowing a host computer making up part of a computer controlled system to communicate with a data storage device that is connected to the system using a bus that allows device-initiated bus-mastering. The system has system RAM which is associated with the host computer and which is not part of the data storage device. The data storage device requires certain device operating data/code in the form of device control means and device operating data to be used to control the operation of the device. The arrangement and method for operating the data storage device include storing at least a portion of the device operating data/code in the system RAM. The arrangement and method also include allowing the host computer and/or the data storage device access to the device operating data/code stored in the system RAM such that the host computer and/or the data storage device may use the device operating data/code to control the operation of the data storage device.

The operating data/code required by the data storage device which may be stored within system RAM for use by the data storage device and/or host computer during the operation of the system may include a wide variety of control functions and/or data. In accordance with the invention, these operating data/code may include in various combinations, but are not limited to the following types of operating data/code. Some of the following types of operating data/code would only apply to certain types of data storage devices while others would apply regardless of the type of data storage device being used. These various operating data/code include: i) storing defect list information identifying defective memory storage locations associated with the data storage device in system RAM and allowing the host computer to perform the function of sorting through the defect list to identify defective memory storage locations associated with a particular read/write request, ii) storing command lists for controlling the operation of the data storage device within system RAM and allowing the host computer and/or data storage device to access and manipulate the command lists, iii) allocating read ahead buffer space within system RAM and allowing the host system to control a read ahead function associated with the data storage device, iv) allocating a write cache buffer space within system RAM and allowing the host computer to control a write caching function associated with the data storage device, v) storing read channel data within system RAM identifying the control settings used by a data storage device controller and allowing the data storage device access to the read channel data in order for the data storage device to properly control its operation, vi) storing servo data within system RAM and allowing the data storage device access to the servo information in order for the data storage device to properly control its operation, and vii) storing drive physical data within system RAM and allowing the host computer to use this information to perform the function of translating address information into address information used by the data storage device.

In one specific embodiment, the operating data/code stored in system RAM allows the host computer to create command lists in the system RAM for controlling the operation of the data storage device. In accordance with this specific embodiment, each particular command list entry includes a command for controlling the operation of the data storage device. Each command list entry also includes a variety of other fields of information which may vary depending upon the specific data storage device being used. Some examples of information which the command list entry may also include are: i) memory storage location information identifying the location of the data on the storage device, ii) a buffer address identifying the destination host memory location within the system to/from which data to/from the data storage device is to be transferred, iii) a pointer identifying defective memory storage locations in host memory specifying a defective storage location on the data storage device, iv) a pointer identifying the next command list entry, and v) command status and error detection information associated with the particular command list entry.

BRIEF DESCRIPTION OF THE DRAWINGS

The features of the present invention may best be understood by reference to the following description of the presently preferred embodiments together with the accompanying drawings in which:

FIG. 1 is a block diagram of a prior art computer system using a ISA bus to connect a first hard disk drive to the system and a PCI bus to connect a second hard disk drive to the system.

FIG. 2A is a block diagram illustrating the operation of the system of FIG. 1 when an application program being run on the system makes a read/write request of the first hard disk drive.

FIG. 2B is a block diagram illustrating the operation of the system of FIG. 1 when an application program being run on the system makes a read/write request of the second hard disk drive.

FIGS. 9A–C are block diagrams illustrating the operation of the system of FIG. 5 when an application program being run on the system makes a read/write request of the hard disk drive.

DETAILED DESCRIPTION

Although the invention will be described in detail using the example of a hard disk drive, it is to be understood that the present invention would equally apply to other storage devices. These other devices include, but are not limited to, CD drives, floppy drives, removable hard disk drives, and other optical, magnetic, and opto-magnetic drive devices. Devices which are currently being developed for use as storage devices for various computer systems such as digital video disk devices and flash memory would also fall within the scope of the invention.

Figure 5:
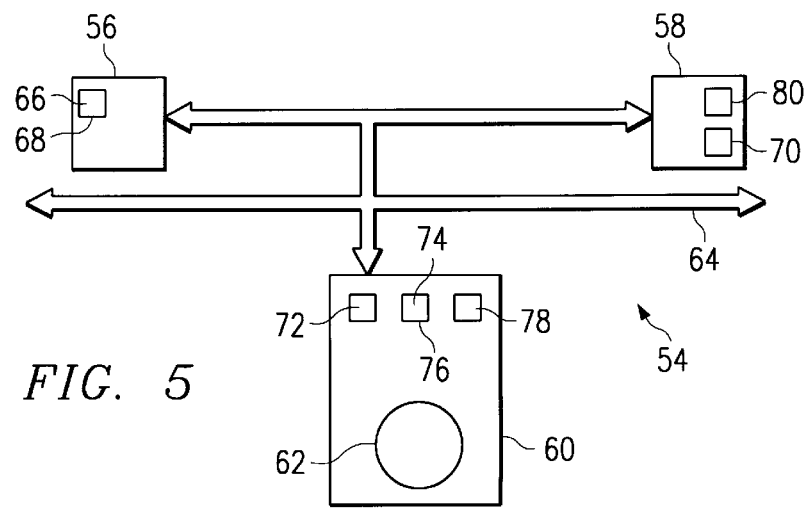
FIG. 5 is a general block diagram of a computer system including a complex disk drive device connected to a host computer having a system RAM associated with the host computer.

Referring to FIG. 5, a computer system designed in accordance with the present invention and generally designated by reference numeral 54 will be described. Computer system 54 includes a host computer 56 having system RAM 58. A complex hard disk drive device 60 having mass memory storage 62 is operatively connected to host computer 56 and system RAM 58 using a bus 64. As mentioned above, the term complex hard disk drive is used to refer to a hard disk drive which includes cylinders, heads, sectors, and zones which clearly define the specific location of each memory storage location on the hard disk drive. The complexity of the drive is caused by the addition of zones as described above.

Host computer 56 and system RAM 58 are made up of any suitable and readily providable components which allow disk drive 60 to be connected to host computer 56 and system RAM 58 using bus 64. These components include, but are not limited to, any conventional 486, Pentium®, Power PC®, or RISC based components. Although host computer 56, system RAM 58, and bus 64 are shown having a particular configuration relative to one another, it should be understood that this is not a requirement of the present invention. Instead, these components may be interconnected in a variety of specific configurations and still remain within the scope of the invention so long as the complex disk drive device 60 may be operatively connected to these components.

Bus 64 may be any suitable and readily providable bus that allows for device initiated bus mastering such as, but not limited to a PCI bus or an IEEE 1394 bus. Although these specific examples of suitable buses are listed, it should be understood that a wide variety of peripheral buses, such as other parallel buses, serial buses, or multiplexed buses would also fall within the scope of the present invention. If a PCI bus is utilized, the PCI specification dictates how any Expansion BIOS associated with the complex hard disk drive device is loaded into RAM 58 of the host system. Other bus configurations have corresponding specifications, and therefore, the present invention will be described in detail assuming that a PCI bus is being used to connect disk drive 60 to host computer 56. The application of the invention to other peripheral bus configurations will become clear to those skilled in the art in view of this disclosure. Although the bus will be described throughout this specification as being a PCI bus, this is not a requirement. Any bus which allows device-initiated bus-mastering may be utilized and still fall within the scope of the invention.

As described in detail in copending U.S. patent application Ser. No. 08/553,024, entitled METHOD AND ARRANGEMENT FOR OPERATING A MASS MEMORY STORAGE PERIPHERAL COMPUTER DEVICE CONNECTED TO A HOST COMPUTER, attorney docket number ITI1P002, filed Nov. 3, 1995, which application is incorporated herein by reference, disk drive 60 may be directly connected to host computer 56 using a PCI bus without using an adapter card such as a SCSI adapter card. If this is the case, drive 60 may be provided in a variety of ways and still remain within the scope of the invention. For example, disk drive 60 may be provided as a plug in PCI disk drive board which is configured to plug directly into a PCI connector of the PCI bus. In a second example, drive 60 may be provided as a combination of one or more IC disk drive control chips located on the mother board of the host computer with the IC disk drive control chips being connected to the PCI bus using traces on the mother board. In this example, a disk drive mechanism that is controlled by the IC disk drive control chips would then be connected to the IC disk drive control chips using a ribbon cable. In still another example, the IC disk drive control chips of the previous example may alternatively be located on a plug in board which plugs into a PCI connector of the host computer with the disk drive mechanism being connected to plug in board using a ribbon cable.

Although disk drive 60 has been described above as being directly connected to the PCI bus, this is not a requirement. Instead, disk drive 60 may be connected to the PCI bus in any appropriate manner including the conventional manner using a SCSI adapter card as described above with reference to FIG. 1. As will be described in more detail hereinafter, all of the above described configurations would equally fall within the scope of the invention so long as at least some of the functions and/or data required for the operation of the disk drive are stored in system RAM for use by the disk drive and/or the host computer during the operation of the disk drive.

Still referring to FIG. 5, host computer 56 is operated using a system BIOS 66 which is stored in a system ROM 68. After the start-up of system 54, an operating system 70 which is loaded into system RAM 58 during the start-up of the system controls the operation of the system. Complex hard disk drive 60 includes a disk drive processor or controller 72 and disk drive firmware 74 which may be partially stored in ROM 76. Disk drive firmware 74 uses controller 72 to control the operation of disk drive 60. Disk drive 60 also includes a RAM memory buffer 78.

In accordance with the present invention, system 54 includes an arrangement for loading certain operating data/code 80 associated with disk drive 60 into system RAM 58.

Operating data/code 80 may include a wide variety of functions and/or data which are required for the operation of disk drive 60 such as a portion of disk drive firmware 74 and certain disk drive operating data such as disk drive operating data 44 described above in reference to FIG. 4. As mentioned above and as will be described in more detail hereinafter, the invention allows operating data/code 80 stored in system RAM 58 to be accessed by host computer 56 and/or disk drive 60 such that host computer 56 and/or disk drive 60 may use operating data/code 80 to control the operation of disk drive 60. These operating data/code may include in various combinations, but are not limited to, i) storing defect list information identifying defective memory storage locations associated with hard disk drive 60 in system RAM 58 and allowing host computer 56 to perform the function of sorting through the defect list to identify defective memory storage locations associated with a particular read/write request, ii) storing command lists for controlling the operation of disk drive 60 within system RAM 58 and allowing host computer 56 and/or disk drive 60 to access and manipulate the command lists, iii) allocating read ahead buffer space within system RAM 58 and allowing host system 56 to control a read ahead function associated with disk drive 60, iv) allocating a write cache buffer space within system RAM 58 and allowing host computer 56 to control a write caching function associated with disk drive 60, v) storing read channel data within system RAM 58 identifying the control settings used by a disk drive controller and allowing the disk drive access to the read channel data in order for the disk drive to properly control its operation, vi) storing servo data within system RAM 58 and allowing disk drive 60 access to the servo data in order for the disk drive to properly control its operation, and vii) storing the drive physical data within system RAM 58 and allowing host computer 56 to use this information to perform the function of translating address information into address information used by disk drive 60.

By storing operating data/code 80 in system RAM 58, these operating data/code do not need to be stored in ROM 76 on the disk drive and/or memory buffer 78 on the disk drive as is the case in a conventional system. This allows the size of ROM 76 and RAM memory buffer 78 to be significantly reduced. Also, since in accordance with the invention many of the complex sorting and translation functions may be moved from disk drive controller 72 to host computer 56, a less complex controller may be used without sacrificing performance. The combination of these reductions in the requirements of ROM 76, RAM memory buffer 78, and controller 72 allow for a substantial cost reduction in providing a disk drive device in accordance with the invention compared with the conventional disk drive device. Also, since the more powerful host computer processor is used to perform many of the functions conventionally performed by the disk drive, these functions are performed more efficiently providing a higher performance system at a lower cost compared to a conventional system.

Operating data/code 80 may be loaded into system RAM 58 in any appropriate manner and still remain within the scope of the invention. For example, operating data/code 80 may be permanently stored in the conventional manner within a ROM 76 on disk drive 60, however, this would reduce the cost savings described above. Using this approach, operating data/code 80 would be loaded into system RAM 58 as an Expansion BIOS in the manner describe in the background of the invention. Alternatively, operating data/code 80, along with the majority or all of the Expansion BIOS associated with disk drive 60, may be stored in mass memory storage 62 of disk drive 60 and loaded into system RAM 58 as described in detail in copending U.S. patent application Ser. No. 08/542,690, entitled METHOD AND ARRANGEMENT FOR PROVIDING BIOS TO A HOST COMPUTER, attorney docket number ITI1P001, filed Oct. 13, 1995, which application is incorporated herein by reference.

Using the approach described in the immediately above referenced application, operating data/code 80 are loaded from memory storage 62 into system RAM 58 during the start-up of the system. This approach allows the size of ROM 76 to be minimized thereby minimizing the cost of disk drive. In a third approach, the operating data/code 80 may be loaded into system RAM as part of a loadable device driver. This approach is described in detail in the earlier referenced copending U.S. patent application Ser. No. 08/553,024 Although only three specific examples of how operating data/code 80 are loaded into system RAM 58 are described, it should be understood that the invention is not limited to these specific examples. In fact, the operating data/code would not even have to be loaded into the system RAM during the start-up process, but instead, could be loaded by the operating system after the start-up process is complete. Therefore, the present invention would equally apply regardless of the specific method used to load operating data/code 80 into system RAM 58.

A significant advantage of storing operating data/code 80 in the storage media of the disk drive device and loading them into system RAM 58 as described in the referenced application is that the operating data/code may be easily updated. Using the conventional approach of storing the operating data/code in a separate ROM IC, updating of the code within ROM would require the device to be physically disassembled in order to replace the ROM chip. However, using the approach of storing the operating data/code in the storage media of the disk drive allows the operating data/code to be updated by simply transferring an updated version of the operating data/code into the storage media of the disk drive device. For example, if a bug is found in the operating data/code or if a revised or improved version of the operating data/code becomes available, the corrected or updated version may be made available on a memory storage medium such as a floppy disk or CD which may be used to transfer the new version of the operating data/code into the storage media of the disk drive device. In some situations, the operating data/code may be stored in a protected portion of the storage media of the disk drive which is not user accessible. In this situation, a utility program may be provided with the updated version of the operating data/code which contains the appropriate mechanism to access and update the protected portion of the storage media which contains the operating data/code.

Now that the basic configuration of system 54 has been described, the operation of the system shown in FIG. 5 will be described in more detail by using the example of one specific preferred embodiment. It should be understood that although only one specific embodiment will be described in detail, the invention would equally apply to a wide variety of specific embodiments. Also, although the embodiment to be described includes certain functions of the disk drive which are performed by the host computer and certain disk drive operating data which is stored in system RAM, the invention is not limited to this combination of functions and data. In fact any combination of functions and data which are stored in system RAM would equally fall within the scope of the invention so long as some portion of the disk drive operating data/code stored in system RAM for use by the disk drive and/or the host computer during the operation of the system.

Figure 3:
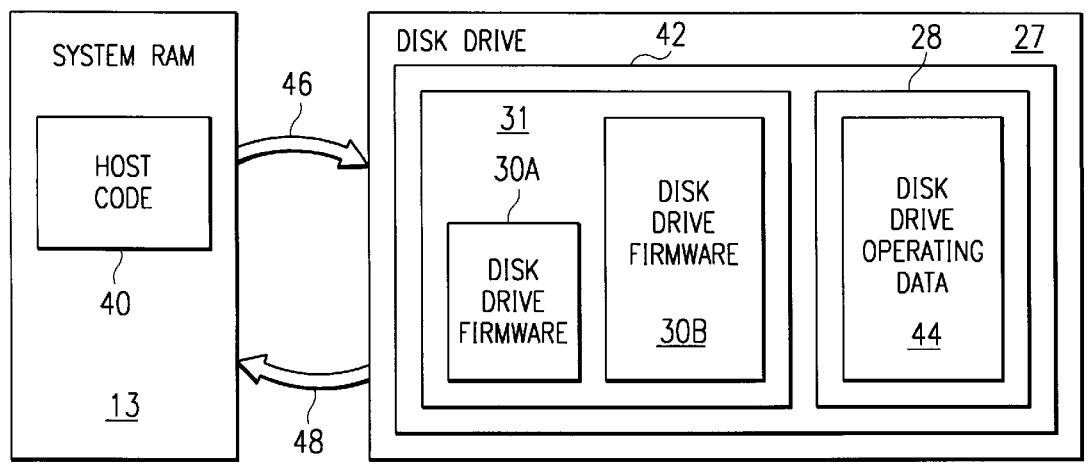
FIG. 3 is a block diagram illustrating the location of various operating data/code used in the operation of one of the prior art hard disk drives shown in FIG. 1.
Figure 4:
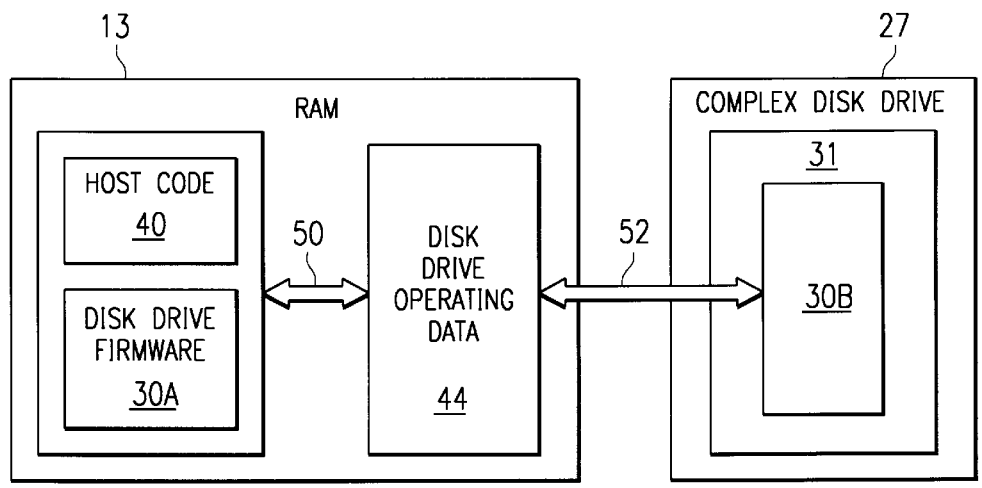
FIG. 4 is a general block diagram illustrating the location of various operating data/code used in the operation of a computer system including a complex hard disk drive in accordance with the present invention.
Figure 6:
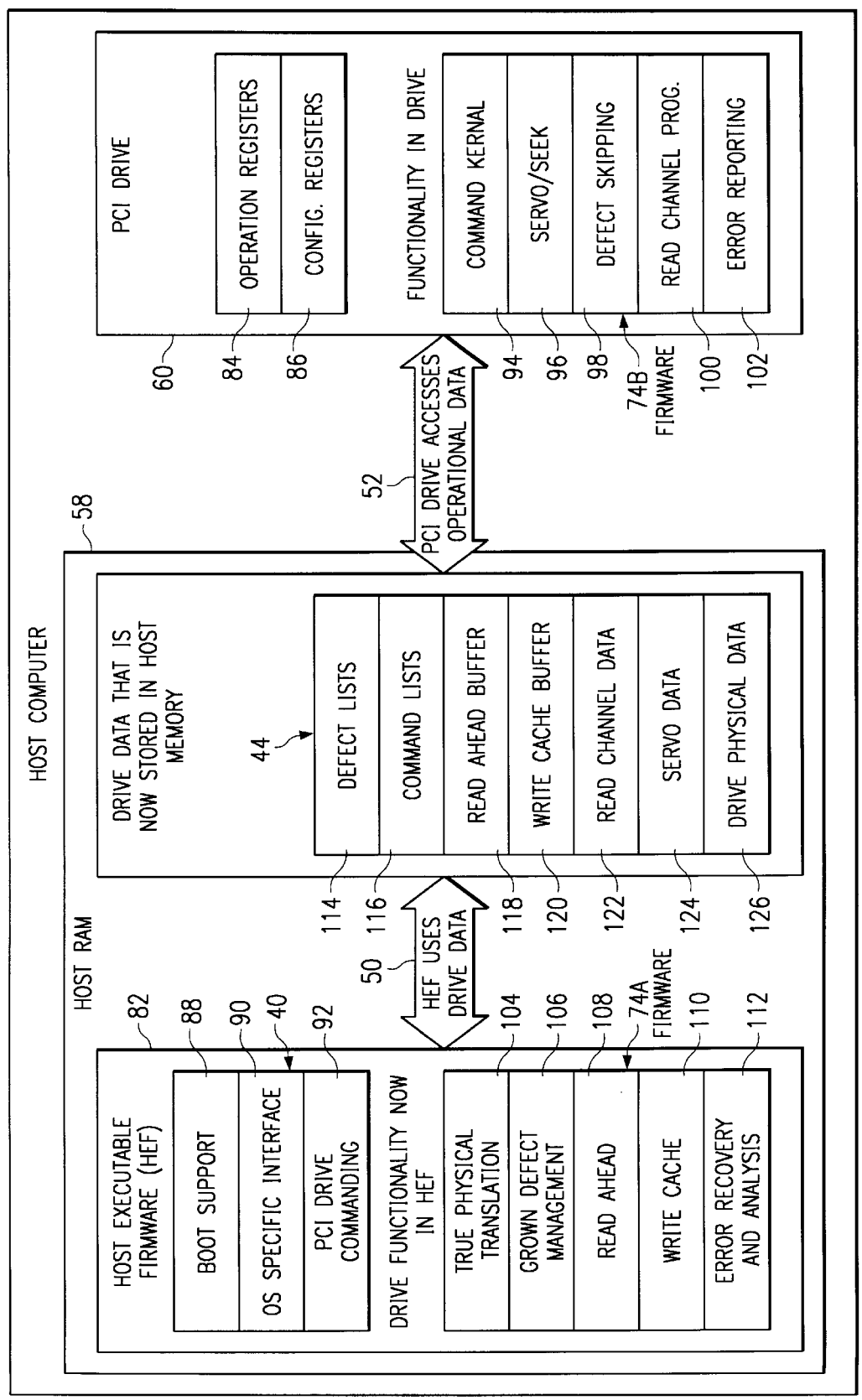
FIG. 6 is a more detailed block diagram of one embodiment of the general block diagram of FIG. 4.

Referring to FIG. 6 which is a more detailed block diagram similar to the block diagram of FIG. 4 described above, the operation of system 54 will be described in detail. As shown in FIG. 6 and as mentioned above in reference to FIG. 4, the present invention includes host executable firmware in system RAM 58 comparable to host code 40 described for the conventional system of FIG. 3. This portion of the host executable firmware is indicated by reference numeral 40 in FIG. 6. As also mentioned above and in accordance with the invention, disk drive operating data 44 is stored in system RAM 58 rather than in the RAM memory buffer 78 of the hard disk drive 60 as would be the case for a conventional system. Furthermore, a portion of the disk drive firmware 74, indicated by reference numeral 74A and which compares with firmware 30A of FIG. 4, is stored in system RAM rather than being stored in ROM on board the disk drive device as was described above in FIG. 3. Only a portion of the disk drive firmware 74, indicated by reference numeral 74B remains stored on board the disk drive for use during the operation of the disk drive. Firmware 74B of FIG. 6 corresponds to firmware 30B of FIG. 4. In accordance with the present invention and as indicated by arrows 50 and 52, the arrangement of the present invention allows both firmware 74B on the disk drive and the firmware stored in system RAM, that is host code 40 and 74A, access to disk drive operating data 44 stored in system RAM. Firmware 40 and firmware 74A, both of which are stored in system RAM 58 are host computer executable and, as indicated in FIG. 6, the combination of these make up a host executable firmware 82 of system 54. And finally, since the disk drive being described for this embodiment is a PCI disk drive designed to utilize PCI protocols, disk drive 60 includes configuration registers 86 used by the system to identify disk drive 60 during the start-up of the system according to the PCI protocol.

Now that the general location of the various operating data/code used in the operation of disk drive 60 have been described, each of the operating data/code will be described in more detail. In the embodiment being described, a portion of the disk drive firmware, that is disk drive firmware 74B, remains within disk drive 60. Generally speaking, firmware 74B is the code which controls the physical actions of disk drive 60. Specifically, in this embodiment, firmware 74B includes command kernel 94 for receiving commands from host computer 56 and initiating the appropriate action. Firmware 74B also includes servo/seek code 96 which controls the precise positioning of the read heads of disk drive 60 based on the memory storage location to be acted upon by the disk drive. Defect skipping 98 is also provided as part of firmware 74B. Defect skipping 98, as will be described in more detail later, uses defective memory storage location information stored in system RAM and provided by host executable firmware 82 to skip defective memory storage locations within disk drive 60. Firmware 74B also includes read channel code 100 which determines the specific control settings used by disk drive controller 72. And finally, firmware 74B includes error reporting 102 which provides error information to the host computer if and when errors are detected during the operation of the disk drive.

Although the functions described immediately above are included within the disk drive firmware which remains within the disk drive, it should be understood that it is not a requirement of the invention that this specific combination of functions remain within the disk drive. Instead, as mentioned above, the various functions may be combined in a wide variety of ways with some of the functions described above being transferred into the system RAM or with additional functions being included in the functions remaining in the disk drive. All of these combinations would fall within the scope of the invention so long as at least some operating data/code associated with the disk drive are stored in system RAM for use by the disk drive and/or the host computer during the operation of the disk drive.

Now that the portion of the operating data/code that remain within the disk drive for this embodiment has been generally described, attention is directed to host executable firmware 82 which includes host code 40 and disk drive firmware 74A. As shown in FIG. 6, host code 40 includes boot support 88 which is provided as part of system BIOS 66. Boot support 88 may be any suitable and readily providable boot support arrangement which allows the system to properly initialize disk drive 60 during the start-up of the system. This boot support arrangement may take on a wide variety of forms depending upon the specific processors, bus and other components used to make up system 54. Firmware 40 also includes OS specific interface 90 which is provided as part of the specific operating system 70 being used to operate system 54. OS specific interface 90 may also be any suitable and readily providable OS specific interface. This interface includes the necessary information and code to allow the operating system to communicate disk drive related requests and address information between the operating system and the host computer. And finally, host code 40 includes PCI drive commanding 92 which includes the command protocol required by the PCI bus and which is provided as part of system BIOS 66. PCI drive commanding 92 may be any suitable and readily providable PCI drive commanding arrangement which provides the necessary protocol, code, and information necessary to allow host computer 56 to maintain command control of disk drive 60. As is the case for boot support 88 and OS specific interface 90, PCI drive commanding 92 may take on a wide variety of specific forms depending on the specific hardware used to make up system 54 and depending on the specific operating system used by the system. It should be understood that in systems using a bus and protocol other than a PCI bus and protocol, PCI drive commanding 92 would be replaced with drive commanding code specific to the bus and protocol being used.

Although the specific functions of Boot Support, OS Specific Interface, and PCI Drive Commanding have been described as being included within host code 40, it should be understood that this portion of the firmware is not limited to this specific combination of functions. Instead, host code 40 may include additional functions or combinations of functions depending on the specific requirements a particular embodiment.

Referring still to host executable firmware 82, the various functions included in the portion of the disk drive firmware which is stored in system RAM and executable by the host computer, that is firmware 74A, will be generally described. As shown in FIG. 6, firmware 74A includes the functions of true physical translation, grown defect management, read ahead, write cache, and error recovery and analysis represented by references numerals 104, 106, 108, 110, and 112 respectively. Generally, true physical translation 104 refers to the code used for and the function of translating logical memory location address information from the operating system into physical memory location address information used by the disk drive. As will be seen, this is the only translation required by system 54. Grown defect management 106 is the function of adding newly found defects to a defect list and insuring that these newly found defective memory storage location are not utilized by the system. Read ahead 108 is the function of providing a read ahead capability and write cache 110 is the function of providing a write caching capability. Error recovery and analysis 112 is the function of analyzing errors which occur during the operation of the disk drive and determining the appropriate action to take in response to the detection of the error. Each of these functions will be described in more detail after the disk drive operating data which is stored within system RAM has been described.

As was mentioned above with respect to the functions which remain within the disk drive, it is to be understood that the specific functions which are moved into system RAM and which are executable by the host system may include a variety of functions. These functions are not limited to, or required to include the specific functions listed above for this embodiment. Any combination of functions and/or data stored within system RAM would fall within the scope of the invention so long as at least some functions and/or data required for the operation of the disk drive are stored in system RAM for use by the disk drive and/or the host computer during the operation of the disk drive.

Referring now to disk drive operating data 44 in FIG. 6, the types of data stored within system RAM for this embodiment will be generally described. As illustrated in FIG. 6, disk drive operating data 44 includes defect lists 114, command lists 116, read ahead buffer 118, write cache 120, read channel data 122, servo data 124, and drive physical data 126. These various types of data will be described in detail hereinafter in conjunction with a detailed description of the operation of the disk drive. Other disk drive operating data may also be included with disk drive operating data 44 and still fall within the scope of the invention. Alternatively, some of the data included in disk drive operating data 44 for this embodiment may be left to remain within the disk drive rather than transferred into system RAM. A wide variety of combinations of data may make up the disk drive operating data which is stored within the system RAM with the invention equally applying to all of these combinations. Furthermore, as indicated by arrows 50 and 52, the arrangement of the present invention allows both firmware 74B on the disk drive and the firmware 82 stored in system RAM, that is host code 40 and 74A, access to disk drive operating data 44 stored in system RAM. As will be described in more detail, this arrangement allows information to be transferred between the disk drive and the host computer so that many of the functions of operating the disk drive may be carried out in a more efficient and intelligent manner improving the performance and capabilities of the overall system.

Now that the functions and data, or operating data/code, which are stored in system RAM have been listed and generally described, the operation of the disk drive, in accordance with the invention, will be described in detail function by function. The first function to be described is the function of creating command lists for controlling the operation of the disk drive. In the embodiment to be described below, both the host system and the disk drive have access to and the ability to manipulate the command lists. Other embodiments may only allow the host computer to manipulate the command lists. Also, it should be understood that the command lists being described are simply one preferred structure for command management. A wide variety of other mechanisms for sending commands from the computer to the disk drive may be used to providing the command management function and still remain within the scope of the invention. These other structures may include, but are not limited to, task file registers, data packets, etc.

Figure 7:
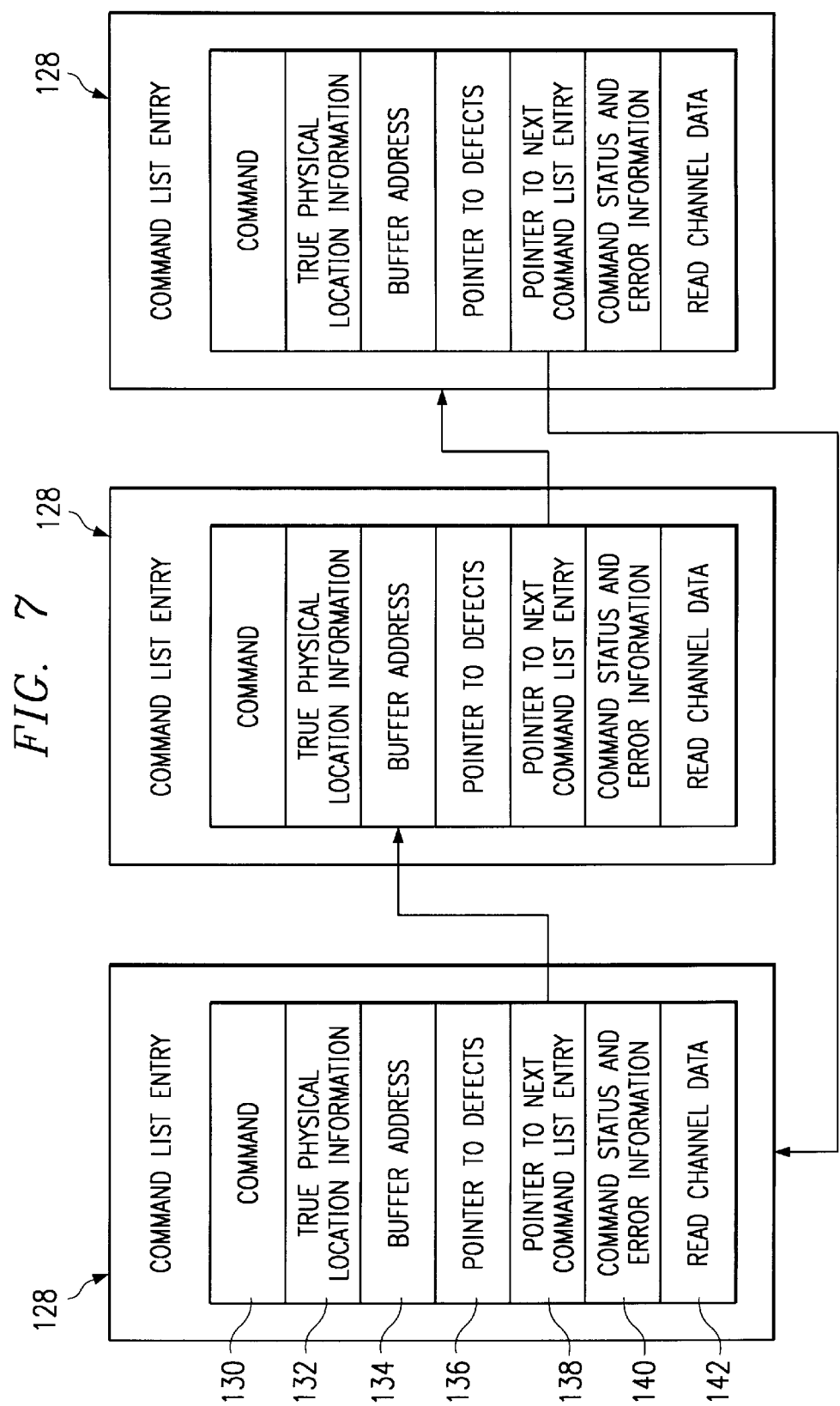
FIG. 7 is a detailed block diagram of one embodiment of a command list format in accordance with the invention.

Referring to FIG. 7, each of the command list entries of the embodiment shown, which are generally designated by reference numeral 128, includes six elements. The first element, command element 130, contains the command for controlling the operation of the disk drive and to be carried out by the disk drive. This command is one command selected from a predetermined list of available commands for operating the disk drive. Following is a listing of the commands supported by this preferred embodiment: NO-OP, ABORT, RESET, SEEK, READ, READ SEQUENTIAL, READ LONG, READ VERIFY, READ BUFFER, WRITE, WRITE LONG, WRITE BUFFER, WRITE SAME, STANDBY IMMEDIATE, IDLE IMMEDIATE, SLEEP, and CHECK POWER MODE. Although these specific commands are supported by this embodiment, it is to be understood that other embodiments may include other commands or exclude some of the commands listed above. All of these embodiments would fall within the scope of the invention regardless of the specific list of commands supported.

Still referring to FIG. 7, in this embodiment, the second element of each command list entry 128 is true physical location information 132. This element contains the starting memory location address within the disk drive which is to be operated upon using the command in the command element. The third element of each command list entry is the buffer address. This element contains the destination or source address for the data associated with the command being processed. The buffer address may alternately point to a list of buffer addresses and their lengths to support scatter gather host buffers. As indicated by reference numeral 136, the fourth element is a pointer to defects. This element contains a pointer to the next successive known defective memory storage location relative to the start address given in the second element. Generally, pointer 136 is the mechanism which allows the host computer to identify to the disk drive the next successive defective memory storage location address relative to the starting address given in element 132. This first successive defective memory storage location is assigned a pointer which is communicated to the disk drive using pointer to defects element 136. The function of this element will be described in more detail when the function of defect management is described.

The next element of each command list entry contains a pointer to the next command list entry which is indicated by reference numeral 138. This pointer is used to create a linked list connecting all of the existing command list entries to form a circular linkage of command list entries. This element indicates the address of a command list entry waiting to be executed. If the current command list entry is the only command list entry to be executed this element would reference its own command list entry. The sixth element of each command list entry is element 140 containing command status and error information. Disk drive 60 uses this element to write the command status and any error information back to the current command list entry in system RAM. This allows the host computer to be aware of the command status of the disk drive and also provides a mechanism for notifying the host system of errors detected by the disk drive during the operation of the command associated with the current command list entry.

Although the command list entries have been described as including a particular combinations of elements in a particular order, this is not a requirement of the invention. Instead, it should be understood that the command list entries may include a wide variety of particular elements arranged in any desired order. All of these combinations would equally fall within the scope of the present invention.

Figure 8:
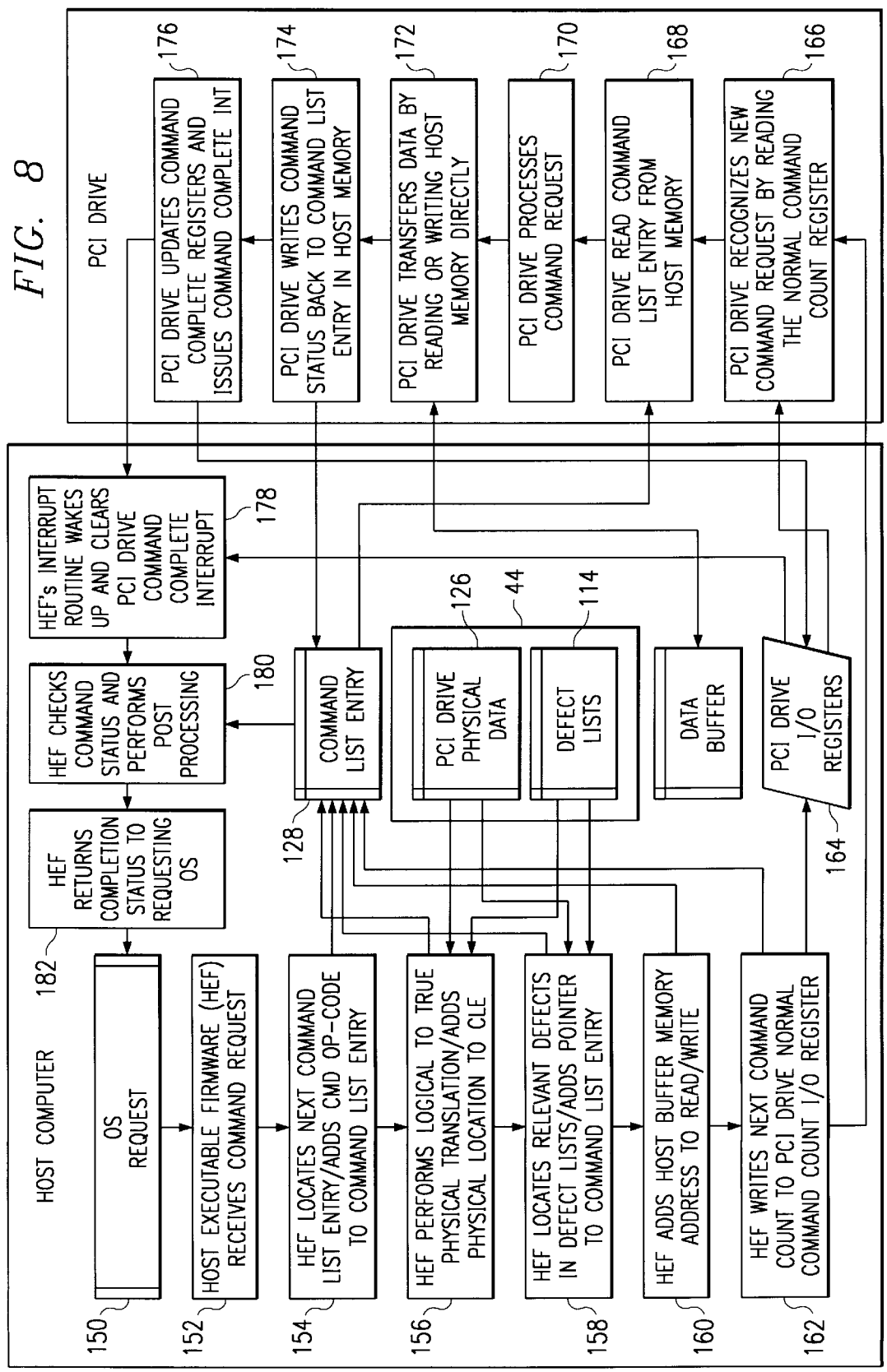
FIG. 8 is a detailed flow chart illustrating the operational use of a command list entry such as the ones shown in FIG. 7.

Now that the command list entry structure has been described, the operational use of the command list will be described while referring to FIG. 8 which is a flow chart illustrating the operational use of command list entries 128. The various steps of the process are carried out by either host executable firmware 82 stored in system RAM 58 of computer system 54 or disk drive firmware 74B in ROM 76 of disk drive 60 as shown by the large boxes indicated by reference numerals 82 and 74B. In this example, disk drive 60 is a PCI disk drive.

As indicated by block 150, the process is initiated when the operating system being used to operate the computer issues a request. Host executable firmware 82 receives the request from the operating system as indicated in block 152. In step 154, host executable firmware 82 locates the next command list entry 128 (described above with reference to FIG. 7) and adds the appropriate command into the first element 130 of the command list entry 128 (for example a read or write command). As will be described in more detail hereinafter, in step 156, host executable firmware 82 uses physical data 126 and defect list 114, which are stored in system RAM 58, to translate the logical address information provided by the operating system into true physical location information used by the disk drive. This true physical location information is put in the second element 132 of command list entry 128. In step 158, host executable firmware 82 locates relevant defects in defect lists 114 and adds a defect pointer into element 136 of command list entry 128. Next, host executable firmware 82 adds a buffer memory address to element 134 of the command list entry in step 160. This indicates the specific portion of host system RAM 58, which acts as a data buffer 161, to be used for this command. And finally, in step 162 host executable firmware 82 writes the next command count to a command count register of the PCI disk drive which is one of PCI drive I/O registers 164. This is the mechanism which a PCI disk drive uses to know that there is a command for the PCI drive to process. At this point control of the process switches over to disk drive firmware 74B.

In step 166, disk drive firmware 74B recognizes that there is a new command for the disk drive by reading command count register 164. Firmware 74B then reads the command list entry from host memory into its internal memory buffer 78 in step 168. In steps 170 and 172, firmware 74B processes the command and transfers the data by directly reading from or writing to data buffer 161 in host system RAM 58. Next, in step 174, firmware 74B writes the command status and any error information to element 140 of the command list entry in host memory. And finally, firmware 74B updates a command complete register in PCI drive I/O registers 164 and issues a command complete interrupt. This is the mechanism which a PCI disk drive uses to indicate that it has finished a command.

In steps 178, host executable firmware 82 recognizes and clears the PCI drive command complete interrupt. This transfers control back the host executable firmware 82. Host executable firmware 82 checks the command status and performs any necessary post processing in step 180. This may include error analysis associated with the error information in element 140 of the command list entry. Completing the overall process, in step 182, host executable firmware 82 returns the completion status to the requesting operation system.

Although the process described above has been described with reference to a system using a PCI bus and PCI protocols, this is not a requirement. Other systems using other buses and protocols would operate in a similar manner and should be clear to those skilled in the art in view of this disclosure. Also, although certain specific functions have been described as being carried out by host executable firmware stored in system RAM and other functions carried out by firmware remaining on the disk drive, it should be understood that other combinations of functions may be transferred to the host with other specific functions remaining in the disk drive.

Next, referring to FIGS. 9A–C the function of translating from the logical memory location address information used by the operating system to the physical memory location address information used by the disk drive will be described in detail. In conventional complex disk drive devices this function requires three translations, as described in detail in the background, and is carried out by the system BIOS and/or the translation BIOS, the protocol translator if an adapter card is present, and the disk drive itself. However, the present invention moves this function into the host computer and performs this function in a single translation.

As illustrated in FIG. 9A, when an application program 200 makes, for example, a read request, operating system 70 receives the request and determines the starting theoretical, or logical, data address at which operating system 70 believes the data is stored within disk drive 60 and the amount of data to be read. In accordance with the present invention, disk drive firmware 74A, which is executed by host computer 56, creates a command list entry 128 which is associated with the read command and which is illustrated in FIG. 9B. This command list entry includes the READ command in first element which as described above is the command element of the command list entry.

As described generally above, disk drive firmware 74A in system RAM 58 includes true physical translation code 104 which translates the logical data address information used by operating system 70 directly into cylinder, head, sector, and zone data address information actually used by disk drive 60. True physical translation code 104 also sorts through defect lists 114 in system RAM 58 to insure that the starting address for the read request is a known good address. This known good starting address is placed in element 132 of the associated command list entry shown in FIG. 9B along with the amount or length of data to be read. In the specific example being described, true physical translation code 104 determines that the read request from the application program corresponds to ten sectors of data stored beginning at the known good memory storage location of cylinder 23, head 1, and sector 1.

FIG. 9C illustrates the portion of defect list 114 which is pertinent to this specific example. The letters A–E in the leftmost column of FIG. 9C represent pointer addresses which identify a specific location within defect lists 114. The second, third, and fourth columns correspond to the specific cylinder, head, and sector of each of the defective memory storage locations. When code 104 sorts through defect list 114 to ensure the starting address is a known good memory location, code 104 also identifies the next successive defective memory storage location following the known good starting address. In this case, as illustrated in FIG. 9C, the next successive memory location that is defective is the location which corresponds to cylinder 23, head 1, and sector 2. Since this defective memory storage location is assigned pointer address C, code 104 inserts pointer address C into the pointer to defects element 136 (FIG. 9B) of the associated command list entry 128 to pass this information to the disk drive. As disk drive controller 72 is positioning head 1 to read the requested information, disk drive firmware 74B uses pointer address C in the pointer to defect element 136 to obtain a predetermined number of the successive defective memory storage locations from defect lists 114 in host RAM beginning with the defective memory storage location indicated by pointer address C. In this case, only the first defective location which corresponds to pointer address C is relevant to the information being read, however, in other specific situations there may be many defective memory storage locations associated with the data to be read. The defect skipping 98 portion (shown in FIG. 6) of disk drive firmware 74B uses these defective memory storage locations which are specific to the data being read to cause disk drive controller 72 to skip the defective memory storage locations and insure that only good data sectors are utilized.

Although only one specific example of the protocol for making the defect information available to the disk drive firmware of the disk drive has been described, it should be understood that the invention is not limited to this specific embodiment. The particular protocol used to provide this function may take on a wide variety of specific forms and still remain within the scope of the present invention. This is also the case for other functions and/or data which may be moved from the disk drive firmware of the disk drive to the system RAM. This includes the situation in which only some or all of the disk drive data such as the defect list, cache buffers, read channel data, or any other disk drive data is stored in the system RAM and the functionality remains within the disk drive. Since the host executable firmware 74A of the present invention communicates directly with the disk drive device without requiring the use of the system BIOS, a wide variety of protocols may be used for the communication between the host executable firmware and the hard disk drive. These protocols do not need to conform to the constraints of the system BIOS and therefore a protocol may be used which maximizes the performance of the particular disk drive device.

By having the system use the system RAM to store the defect information and use the host computer to perform the translation and sorting tasks, in other words by shifting these tasks from the hard drive to the host computer, the cost of the hard drive may be significantly reduced. Specifically, in a typical conventional hard drive, the memory buffer is large enough to store at least 128 sectors of data which requires at least 64K of RAM. A large portion of this memory buffer is used to store the defect lists for use by the disk drive controller throughout the operation of the disk drive. By storing the defect lists in system RAM rather than the memory buffer of the disk drive a much smaller memory buffer may be used reducing the cost of providing the necessary memory buffer. Also since a significant amount of the tasks performed by the conventional disk drive firmware of a prior art disk drive have been moved into the system RAM in the form of host executable firmware 74A, the disk drive controller and the disk drive firmware remaining within the disk drive may be significantly less complex. This approach allows a less expensive disk drive controller to be used without reducing the performance of the disk drive and, because the complexity of the disk drive firmware remaining within the disk drive (firmware 74B) is significantly reduced, this approach significantly reduces the ROM storage space required to store the disk drive firmware. The combination of these cost savings results in a substantial overall cost savings for a hard disk drive designed in accordance with the present invention.

Another advantage of this approach is that only one translation needs to be performed between the operating system and the disk drive. Because the system RAM includes the defect information 114 and information on the zones and the specific physical configuration of the disk drive 126, host executable firmware 74A is able to translate the logical data address information from the operating system directly into the actual physical data address information used by the disk drive. In the conventional approach illustrated in FIG. 2A and 2B, three levels of translation are required to perform this function. Since the system BIOS or translating BIOS of the conventional system do not have access to the defect information or the specific physical configuration and zone information of the disk drive, the firmware of the conventional disk drive itself must perform one of the three levels of translation in order to determine the actual physical data storage location and then use this actual data storage location to cause the disk drive controller to read or write the requested data. By eliminating this additional translation performed by the disk drive firmware of the prior art system and reducing the translations to a single translation, the approach of the invention speeds up the overall process of handling a read/write request from the operating system and the disk drive and improves the performance of the overall system.

Although the function of translating the address information and sorting through the defect list has been described as being done by the host computer, this is not a requirement. As is the case for any particular function, this function may be done by the disk drive rather than the host computer. If this is the case, the defect list may still be stored in the system RAM. The disk drive would also be responsible for sorting through the defect list to avoid using bad storage locations. This arrangement would still provide the advantage of not requiring RAM on the disk drive to store the defect list during the operation of the disk drive.

In conventional disk drives, a fairly large RAM memory buffer is provided as part of the disk drive. In some conventional disk drives, a portion of this RAM memory buffer is used as a read ahead memory cache. However, as mentioned above, the present invention allows this function to be moved from the disk drive to the host computer. By doing this, host system RAM may be used to provide the memory space for the read ahead memory cache thereby reducing the amount of memory buffer RAM necessary within the disk drive. Also, in some conventional disk drives, a portion of the RAM memory buffer is used as a write cache. The present invention allows this function to also be moved from the disk drive to the host computer. By doing this, host system RAM may be used to provide the memory space for the write cache thereby further reducing the amount of memory buffer RAM necessary within the disk drive. As mentioned generally above, the firmware for controlling the read or write cache may remain in the disk drive or be moved to the system RAM of the host computer.

In conventional disk drives, the disk drive firmware which controls the operation of the drive controller typically includes information on various settings which are used to control the drive controller. One example of this is the various data read/write rates associated with the different zones of the disk drive. As mentioned above, data associated with and the function of providing these chip settings or settings for controlling the operation of the drive controller may be included as part of the functions and/or data loaded into host system RAM.

Although the peripheral bus has been described in the earlier embodiments as being a PCI bus, this is not a requirement. As mentioned above, any bus which allows firmware and/or data associated with the hard disk drive to be stored within system RAM for use by the disk drive and/or the host computer would equally apply. One example of such a bus is a 1394 bus. Also, although the addressing scheme for addressing the hard disk drive device has been described throughout as using a CHS or cylinder, head, sector, and zone addressing scheme, this is not a requirement. Instead, any addressing scheme including, but not limited to, linear addressing schemes or holographic addressing schemes using XYZ coordinates to define memory locations would also fall within the scope of the invention. Therefore, the present examples are to be considered as illustrative and not restrictive, and the invention is not to be limited to the details given herein, but may be modified within the scope of the appended claims.

What is claimed is:

1. In a computer controlled system including a data storage device connected to a host computer using a bus, the system having system RAM which is associated with the host computer and which is not part of the data storage device, the data storage device having certain device operating data/code including device control and device operating data to be used to control the operation of the device, an arrangement for operating the data storage device, the arrangement comprising:

(a) means for storing at least a portion of the device operating data/code in the system RAM; and
   (b) means for allowing the host computer and the data storage device access to the device operating data/code stored in the system RAM such that the host computer and the data storage device may use the device operating data/code to control the operation of the data storage device.

2. An arrangement according to claim 1 wherein the data storage device is a hard disk drive.

3. An arrangement according to claim 1 wherein the data storage device is a CD drive.

4. An arrangement according to claim 1 wherein the data storage device is a floppy disk drive.

5. An arrangement according to claim 1 wherein the bus is a PCI bus.

6. An arrangement according to claim 1 wherein the bus is an IEEE 1394 bus.

7. An arrangement according to claim 1 wherein the computer controlled system is a personal computer system.

8. A data storage device for use in a computer controlled system in which the data storage device is connected to a host computer using a bus which allows device-initiated bus-mastering, the system having system RAM which is associated wit the host computer and which is not part of the data storage device, the data storage device requiring certain device operating data/code in the form of device control means and device operating data to be used to control the operation of the device, at least a portion of the device operating data/code being located in the system RAM during the operation of the system, the data storage device comprising:

means for allowing the data storage device access to at least a portion of the device operating data/code stored in the system RAM such that the data storage device may use the device operating data/code to control its operation.

9. A data storage device according to claim 8 wherein the data storage device further includes means for storing within system RAM the portion of the data storage device operating data/code which is located in system RAM for use during the operation of the system.

10. A method of allowing host computer having host RAM associated with the host computer to communicate with a data storage device connected to the host computer using a bus, the data storage device having certain device operating data/code including device control and device operating data to be used to control the operation of the device, the method comprising the steps of:

(a) storing at least a portion of the device operating data/code in the host RAM; and
   (b) allowing the data storage device and the host computer access to at least a portion of the device operating data/code stored in the host RAM such that the data storage device and the host computer may use the device operating data/code to control operation of the data storage device.

* * * * *